United States Patent [19]
Dupuy

[11] Patent Number: 5,475,947
[45] Date of Patent: Dec. 19, 1995

[54] FLEXIBLE SEALING UNIT FOR MOVABLE WINDOWS

[75] Inventor: Ronald E. Dupuy, Wabash, Ind.

[73] Assignee: GenCorp Inc., Fairlawn, Ohio

[21] Appl. No.: 247,661

[22] Filed: May 23, 1994

[51] Int. Cl.$^6$ ..................................................... E06B 7/16
[52] U.S. Cl. ............................................. 49/490.1; 49/440
[58] Field of Search ......................... 49/440, 441, 490.1, 49/460, 462, 504

[56] References Cited

U.S. PATENT DOCUMENTS

| | | | |
|---|---|---|---|
| 3,547,515 | 12/1970 | Shanok et al. | 49/462 X |
| 3,724,135 | 4/1973 | Heliotes | 49/504 |
| 3,922,460 | 11/1975 | Jackson | 49/490.1 X |
| 4,196,546 | 4/1980 | Bright | 49/490 |
| 4,240,227 | 12/1980 | Hasler et al. | 49/348 |
| 4,357,781 | 11/1982 | Ohya et al. | 49/227 |
| 4,454,688 | 6/1984 | Rest et al. | 49/502 |
| 4,470,223 | 9/1984 | Mesnel | 49/441 |
| 4,561,211 | 12/1985 | Raley et al. | 49/374 |
| 4,571,888 | 2/1986 | Jensen | 49/450 |
| 4,649,668 | 3/1987 | Skillen et al. | 49/374 |
| 4,787,175 | 11/1988 | Adell | 49/462 |
| 4,937,126 | 6/1990 | Jackson | 49/490.1 X |
| 5,010,689 | 4/1991 | Vaughan | 49/440 |
| 5,143,772 | 9/1992 | Iwasa | 49/490.1 X |
| 5,311,711 | 5/1994 | Desir, Sr. | 49/490.1 X |
| 5,319,883 | 6/1994 | Gueneau et al. | 49/441 X |

*Primary Examiner*—Philip C. Kannan
*Attorney, Agent, or Firm*—Robert F. Rywalski; Gerald H. Glanzman

[57] ABSTRACT

A sealing unit for a movable window of a vehicle. The sealing unit includes a one-piece, elongated, flexible sealing member having a first portion for mounting the sealing unit to a frame of a vehicle and a second portion for receiving the movable window, and a flexible, decorative trim associated with a surface of the sealing member that is viewable from the exterior of the vehicle when the sealing unit is mounted to the frame. Both the sealing member and the decorative trim are sufficiently flexible to permit the sealing unit to conform to the contour of the frame when the sealing unit is mounted to the frame in a single mounting operation to provide a substantially continuous seal between the frame and the sealing unit.

11 Claims, 2 Drawing Sheets

5,475,947

FLEXIBLE SEALING UNIT FOR MOVABLE WINDOWS

BACKGROUND OF THE INVENTION

1. Field of the Invention

The present invention relates generally to a sealing unit for movable windows; and, more particularly, to a flexible sealing unit with decorative trim mountable to a frame of a vehicle as a prefabricated unit for providing a seal between the frame and a movable window of the vehicle. In addition, the present invention relates to an improved method for sealing a movable vehicle window.

2. Description of the Prior Art

In the design of modern vehicles such as automobiles, it is desirable for the movable windows of the vehicle to be flush or substantially flush with the outer surface of the vehicle body in order to provide a more attractive, streamlined appearance and to reduce drag on the vehicle when is being driven.

In such vehicle designs, however, it is often difficult to provide an effective seal for the movable window. In particular, such a seal must properly follow the contours of the vehicle frame and of the window so as to provide an effective seal therebetween; and, in addition, it must reliably retain the window so as to prevent the window from moving away from the vehicle body when the window is closed, thus causing air gaps, even when the vehicle is moving at a high rate of speed.

Known glassrun seals for flush-mounted movable vehicle windows are often formed of a plurality of components which are separately mounted to a frame portion of the vehicle to provide a complete sealing assembly. For example, known seals often include first and second generally U-shaped members which form outer and inner guides, respectively, for a movable vehicle window. To mount such a seal to a vehicle, the first U-shaped member is initially positioned relative to the frame and then affixed to the frame with an adhesive. The second U-shaped member is then mounted to the vehicle frame and to the first U-shaped member to complete the sealing assembly. One or both of the U-shaped members are generally formed of a relatively rigid material and/or are sometimes provided with a wire core or other appropriate stiffening means for providing the seal with substantial rigidity so as to effectively retain the window against movement. Often also, the sealing assembly further includes a metallic strip, which is a separate component from the U-shaped members and which is fastened to the vehicle frame and positioned on a surface of the seal so as to be viewable from the exterior of the vehicle to function both as a decorative trim and as a means for enhancing the rigidity of the seal.

A movable vehicle window sealing assembly as described above must be assembled to a vehicle frame in several steps; and, therefore, the mounting process is relatively time-consuming and costly. Also, because of the relative rigidity of the metallic strip decorative trim, it is difficult to properly conform the various components to the contour of the vehicle frame; and gaps often occur between the trim and the vehicle body which pose a source of leakage. Often, in fact, adhesive strips or the like must be inserted at various locations between the trim and the vehicle frame to fill in the gaps to provide a continuous seal between the seal and the vehicle frame.

SUMMARY OF THE INVENTION

The present invention provides a sealing unit for a movable window that is mountable to a frame as a prefabricated unit for providing an effective seal between the movable window and the frame. A sealing unit according to the present invention includes an elongated flexible sealing member including a first portion for mounting the sealing unit to the frame and a second portion for receiving the movable window, and a flexible, decorative trim associated with an exterior surface of the sealing member when the sealing unit is mounted to the frame, both the sealing member and the decorative trim associated therewith being sufficiently flexible to permit the sealing unit to conform to the contour of the frame when the sealing unit is mounted to the frame for providing a substantially continuous seal between the frame and the sealing unit.

With the present invention, because the sealing unit is a complete, prefabricated unit, it can be easily mounted to the frame in a single mounting operation thus providing a substantial reduction in manufacturing cost and time. Further, in the present invention, both the sealing member and the decorative trim associated therewith are sufficiently flexible to permit the sealing unit to accurately conform to the contour of the frame as it is mounted thereto so as to provide a continuous and effective seal without gaps between the sealing unit and the frame.

The sealing unit of the present invention is especially designed as a seal for movable vehicle windows such as automobiles and other vehicles, and an important feature of the invention is that the decorative trim is not required to contribute to the rigidity of the seal as in many prior art constructions. Accordingly, it can be provided solely for decorative purposes as a part of the overall vehicle trim and this provides the manufacturer with substantial latitude in selecting a decorative trim having the desired characteristics and appearance for a particular vehicle.

The sealing member, according to a presently preferred embodiment of the invention, comprises a first generally U-shaped portion which is mountable to a pinchweld flange of a vehicle door window frame, and a second generally U-shaped window sealing portion which is adapted to receive the edge of a movable window. The first and second U-shaped portions are integrally formed and have a common central wall portion to define a generally S-shaped overall cross-section for the member. An outer surface of the sealing member is exposed to and viewable from the exterior of the vehicle and bears the decorative trim thereon.

The sealing member is preferably formed by extruding or molding a thermoplastic or thermoplastic elastomeric material and can include dual or multidurometer profiles. The decorative trim can comprise a brite trim strip subassembly including, for example, a thin Mylar strip of any desired color, which can be affixed to the outer surface of the sealing member by a suitable adhesive. Alternatively, the decorative trim can be formed of polished metal or comprise the treated or untreated outer surface of the sealing member.

According to a further aspect, the present invention provides an improved method for sealing a movable window of a vehicle which comprises the steps of providing a prefabricated, flexible sealing unit by providing an elongated, flexible sealing member having a first portion for mounting the sealing unit to a frame of a vehicle and a second portion for receiving a movable window, and providing a flexible, decorative trim on a surface of the sealing member at a position viewable from the exterior of the vehicle when the sealing unit is mounted on the frame; and mounting the prefabricated sealing unit to the frame by mounting the first portion of the sealing member to the frame while, at the same time, conforming the flexible sealing unit to the contour of the frame.

The method according to the present invention permits the sealing unit to be mounted to the frame of a vehicle in a single mounting operation without the need for clips or special tools and thus provides substantial savings in both manufacturing time and costs.

Yet further advantages and specific details of the invention will become apparent hereinafter in conjunction with the following detailed description of presently preferred embodiments thereof.

DETAILED DESCRIPTION OF THE PREFERRED EMBODIMENTS

Figure 1:
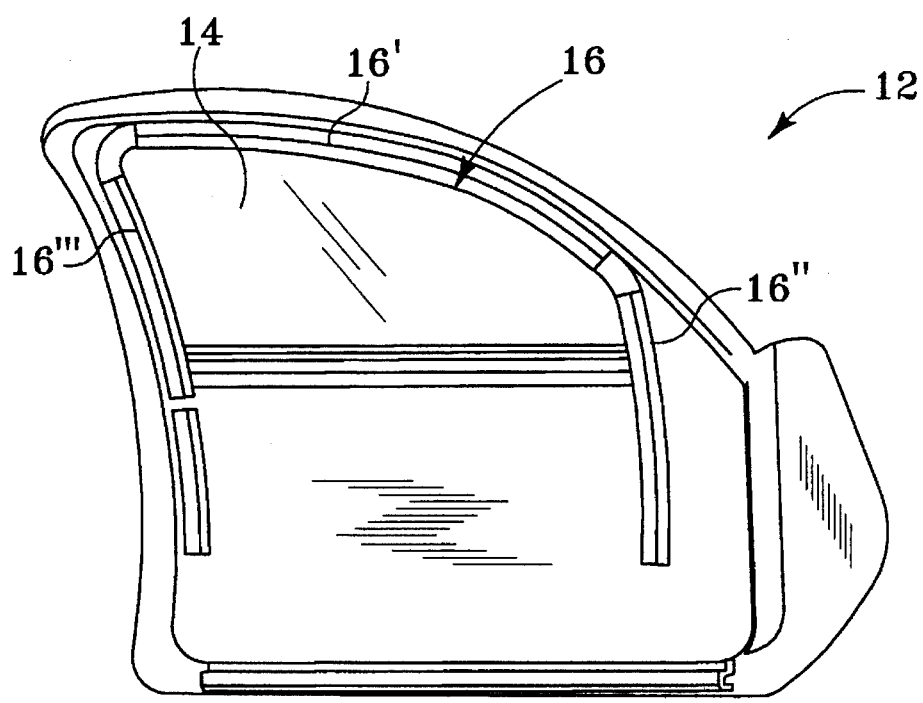
FIG. 1 is a schematic view of a front side door assembly of an automobile schematically illustrating sealing units according to a presently preferred embodiment of the invention.

FIG. 1 is a schematic view of a front side door assembly of a vehicle such as an automobile incorporating sealing units according to a presently preferred embodiment of the invention. The front side door assembly is generally designated by reference number 12 and includes a window 14 which is movable in a vertical direction. As is well-known in the art, the window 14 is slidably received in vertical guide tracks in the door frame so as to be flush or substantially flush with the adjacent vehicle structure when in its raised or closed position as illustrated in the FIG.

When the window 14 is closed, its edges are adapted to be received within and engaged by sealing unit 16 which is mounted to a frame of the vehicle. The sealing unit 16 functions to provide a seal between the window and the adjacent vehicle structure; and, in addition, to keep the window secure, particularly when the vehicle is travelling at a high speed. In the illustrated embodiment, the sealing unit 16 includes, for example, a header glassrun 16', an A-pillar glassrun 16" and a B-pillar glassrun 16"'.

It should be recognized that the sealing unit 16 illustrated in FIG. 1 is exemplary only, and different arrangements may be provided depending on, for example, the particular vehicle on which the sealing unit is to be provided.

Figure 2A:
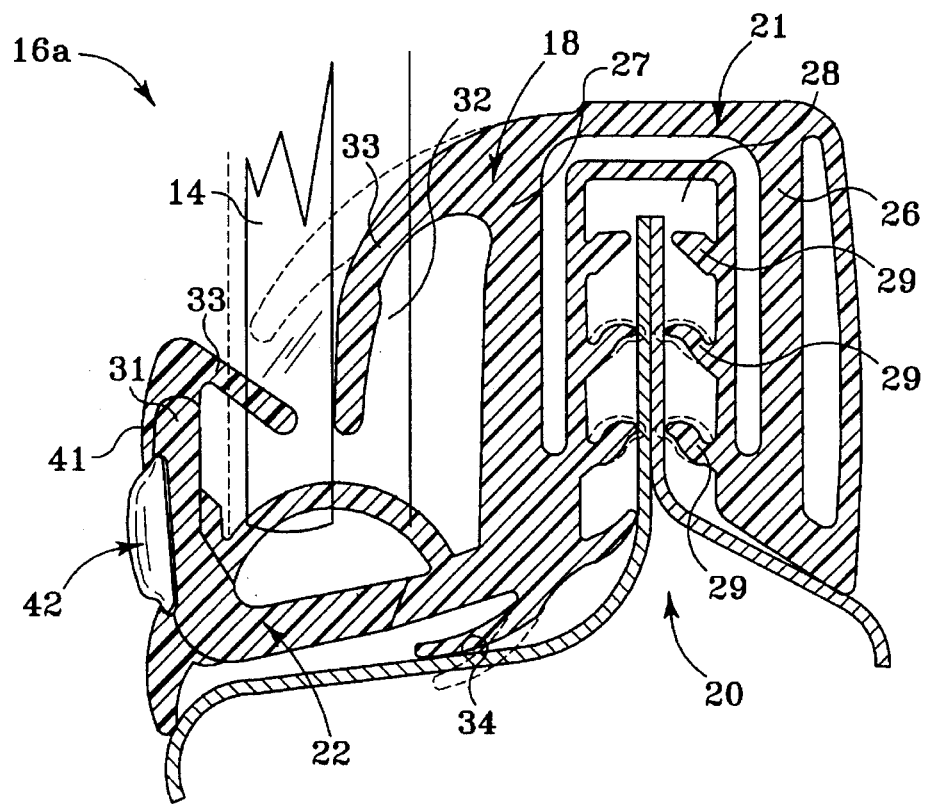
FIGS. 2A and 2B are schematic, cross-sectional views of alternative embodiments of a sealing unit of FIG. 1 mounted to a frame of the vehicle.

FIG. 2A is a cross-sectional view of a sealing unit 16a according to a presently preferred embodiment of the invention affixed to a pinchweld flange 20 of the door frame of the vehicle. The sealing unit 16a comprises a one-piece sealing member 18 having a first generally U-shaped portion 21 which is securable to the pinchweld flange 20 of the vehicle door window frame, and a second generally U-shaped window sealing portion 22 for receiving the upper edge of the movable window 14. As illustrated in FIG. 2A, the second U-shaped portion 22 is generally inverted relative to the first U-shaped portion 21 such that the sealing member 18 defines a generally S-shaped overall cross-section.

The first U-shaped portion 21 includes a first wall portion 26 which is adapted to face inwardly of the vehicle and a second wall portion 27 which functions as a common wall portion for both the first and second generally U-shaped portions. The walls 26 and 27 define a recess 28 therebetween within which the pinchweld flange 20 of the vehicle door window frame is received and includes various finger structures 29 which engage the flange to secure and retain the sealing unit to the flange.

The second generally U-shaped portion 22 comprises an outer wall portion 31 which, together with the common wall portion 27, defines a recess 32 for receiving the edge of movable vehicle window 14 as shown in the FIG. As shown in FIG. 2A, inwardly extending finger structures 33 are formed in the second U-shaped portion to engage the window when the window is in a closed position to provide an effective seal therebetween.

The sealing member 18 also includes appropriate finger structures 34 and is otherwise configured to provide a continuous and effective seal between the sealing member and the vehicle window frame as will be described more fully hereinafter.

The sealing member 18 can be formed by extruding or molding suitable thermoplastic or thermoplastic elastomeric materials and is designed to have sufficient flexibility so that it can accurately conform to the shape of the vehicle window frame without leaving any air gaps therebetween. For example, suitable materials for the sealing member include EPDM, TPR and TPO, and a suitable flexibility could be about 80 durometer. Alternatively, the sealing member 18 can include dual or multidurometer profiles wherein the sealing portions of the element have a different durometer than other portions of the element.

The outer wall portion 31 of second U-shaped portion 22 includes a decorative trim on the outer surface 41 thereof that is viewable from the exterior of the vehicle when the sealing unit 16a is mounted to the vehicle window frame and which functions as a part of the overall decorative trim of the vehicle. In the presently preferred embodiment illustrated in FIG. 2A, the decorative trim comprises a brite trim strip subassembly 42 that is affixed to the sealing member; and FIG. 3 is a schematic cross-sectional view illustrating the construction of the brite trim strip subassembly 42.

Figure 3:
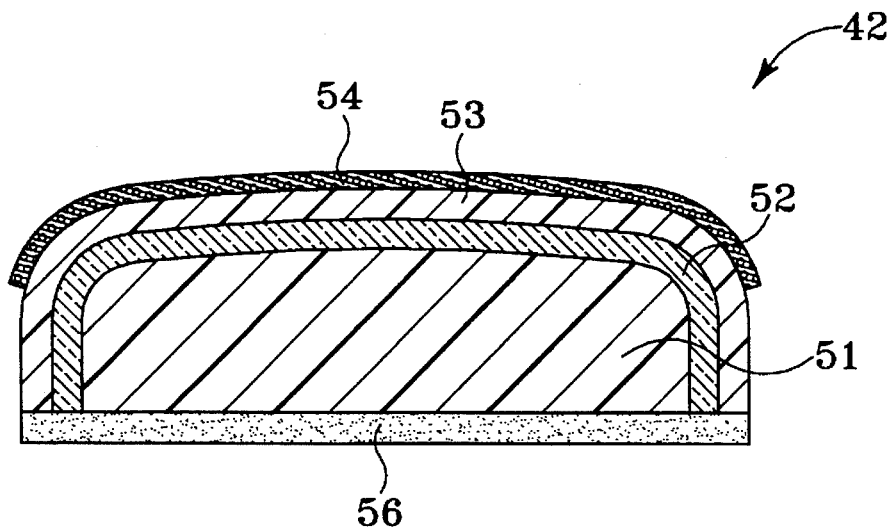
FIG. 3 is a cross-sectional view illustrating the decorative trim subassembly of the sealing unit of FIG. 2A in greater detail.

As shown in FIG. 3, the subassembly includes a core 51 of, for example, PVC to the outer surface of which is affixed a thin, flexible decorative strip 52 of, for example, Mylar tape. The Mylar tape can be of any desired color, for example, to match the exterior color of the vehicle. The decorative strip 52 is covered by a coating of clear PVC 53, and a protective tear strip 54 is applied to and covers the PVC coating and is adapted to be removed after installation of the sealing unit. An adhesive layer 56 is provided on the lower surface of the core 51 to affix the brite trim strip subassembly 42 to the surface 41 of sealing member 18 although other forms of attachment may also be utilized.

An important property of brite trim strip 42 is that it is quite flexible so that it will not, in any way, interfere with the overall flexibility of the sealing unit 16a. Accordingly, the strip 42 can be affixed to the sealing member 18 to provide a complete sealing unit 16a that can be installed as a prefabricated unit to the vehicle window frame without interfering with the ability of the unit to be accurately conformed to the shape of the frame.

Figure 2B:
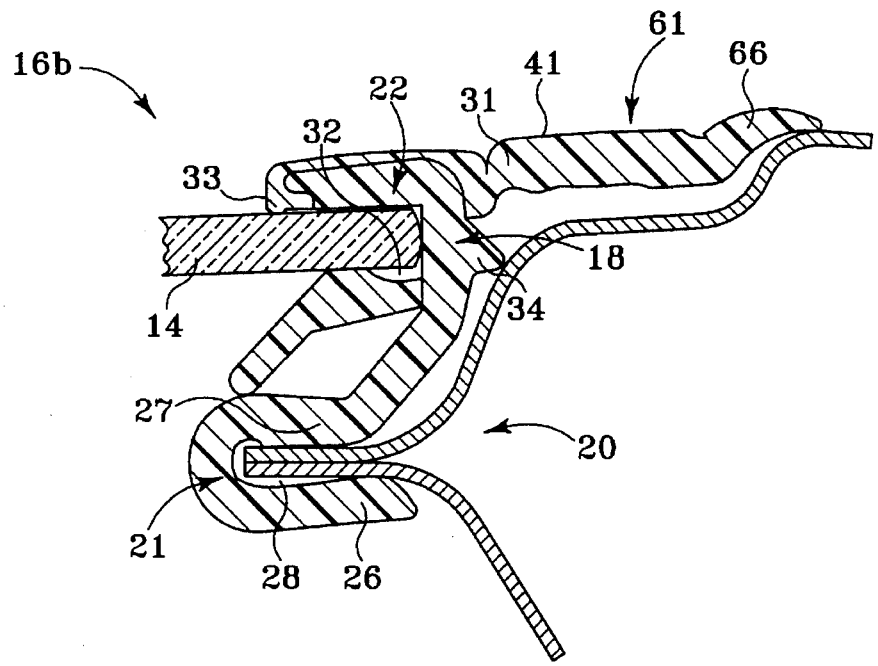

Sealing unit 16b of FIG. 2B, although configured somewhat differently than sealing unit 16a of FIG. 2A for use in its particular application is generally similar to sealing unit 16a of FIG. 2A in most respects except that the brite trim strip subassembly 42 has been replaced with a black trim decorative trim 61 in which the outer surface 41 of the sealing member 18 itself functions as the decorative trim. In this alternative embodiment, the outer surface 41 may be provided with a coating to render it shiny or provided with a roughened appearance depending on the particular application. It may also be painted an appropriate color, if desired.

Also, sealing unit 16b may be provided with a dual durometer profile in which outer wall portion 66 has a durometer of, for example, 70 durometer, while the remainder of the sealing unit has a durometer of, for example, 90 durometer.

The sealing unit 16a or 16b of the present invention is adapted to be mounted to a window frame such as a vehicle window frame in a single mounting operation, and because it is capable of readily conforming to the contour of the frame, provides a continuous, effective seal between the sealing unit and the frame throughout the length of the frame. The sealing unit of the invention can be applied along both the header and side portions of the window frame and be readily adapted for any conventional movable vehicle window.

While what has been described constitutes presently preferred embodiments, it should be understood that the invention could take numerous other forms. For example, although the preferred embodiments are described in connection with a movable window of a front automobile door, it may be utilized in connection with any movable window of any vehicle or in other applications. Also, the particular cross-sectional shape and configuration of the sealing member 18 can be varied in many ways without departing from the invention. Further, in addition to the brite trim strip subassembly described herein, other brite trim strips, including flexible metallic strips, can also be utilized. Because the invention can take numerous other forms, it should be recognized that the invention should be limited only insofar as is required by the scope of the following claims.

I claim:

1. A sealing unit for a movable window, said sealing unit comprising a prefabricated sealing unit mountable to a frame for providing a seal between said movable window and said frame, said prefabricated sealing unit comprising:

an elongated, flexible sealing member including a first portion for mounting said prefabricated sealing unit to said frame, and a second portion for receiving said movable window; and a flexible, decorative trim strip affixed to a surface of said sealing member which will be an external surface when said prefabricated sealing unit is mounted to said frame, both said sealing member and said decorative trim strip affixed thereto being sufficiently flexible to permit said prefabricated sealing unit to accurately conform to the contour of said frame as said prefabricated sealing unit is being mounted to said frame for providing a substantially continuous seal between said frame and said prefabricated sealing unit.

2. The sealing unit of claim 1 wherein said first and second portions comprise generally U-shaped portions which are substantially inverted with respect to one another.

3. The sealing unit of claim 1 wherein said decorative trim strip is affixed to said sealing member by an adhesive.

4. The sealing unit of claim 1 wherein said decorative trim strip comprises a subassembly including a core, a thin, flexible tape affixed to an upper surface of said core, and an adhesive applied to a lower surface of said core for affixing said subassembly to said sealing member.

5. The sealing unit of claim 4 wherein said flexible tape comprises a flexible Mylar tape.

6. The sealing unit of claim 4 wherein said subassembly further includes a protective tape for covering said subassembly which is removable after said sealing unit has been mounted to said frame.

7. The sealing unit of claim 1 wherein said elongated, flexible sealing member comprises a member having portions of different durometer.

8. A sealing unit for a movable window of a vehicle, said sealing unit comprising a prefabricated sealing unit mountable to a frame of said vehicle for providing a seal between said movable window and said frame, said prefabricated sealing unit comprising:

an elongated, flexible sealing member including a first portion for mounting said prefabricated sealing unit to said frame and a second portion for receiving said movable window; and a flexible, decorative trim strip affixed to a surface of said sealing member that will be viewable from the exterior of said vehicle when said prefabricated sealing unit is mounted to said frame, both said sealing member and said decorative trim strip affixed thereto having sufficient flexibility to permit said prefabricated sealing unit to accurately conform to the contour of said frame as said prefabricated sealing unit is being mounted to said frame for providing a substantially continuous seal between said frame and said prefabricated sealing unit.

9. The sealing unit of claim 8 wherein said flexible, decorative trim strip includes a Mylar tape strip affixed to said surface of said sealing member.

10. A method for providing a seal for a movable window of a vehicle, comprising:

providing a prefabricated flexible sealing unit by (a) providing an elongated flexible sealing member having a first portion for mounting said sealing unit to a frame of said vehicle and a second portion for receiving a movable window, and (b) affixing a flexible, decorative trim strip to a surface of said sealing member at a position that will be viewable from the exterior of said vehicle when said prefabricated sealing unit is mounted to said frame; and mounting said prefabricated sealing unit to said frame by mounting said first portion of said flexible sealing member to said frame while, at the same time, accurately conforming said flexible prefabricated sealing unit to the contour of said frame.

11. The method of claim 10 wherein said flexible, decorative trim strip includes a protective covering, and wherein said method further includes the step of removing the protective covering from said flexible, decorative trim strip after said prefabricated sealing unit is mounted to said frame.

* * * * *